(12) United States Patent
Tang et al.

(10) Patent No.: US 10,142,105 B2
(45) Date of Patent: Nov. 27, 2018

(54) HYPERSPHERE-BASED MULTIVARIABLE PUBLIC KEY ENCRYPTION/DECRYPTION SYSTEM AND METHOD

(71) Applicant: South China University of Technology, Guangzhou, Guangdong Province (CN)

(72) Inventors: Shaohua Tang, Guangzhou, Guangdong Province (CN); Jiahui Chen, Guangzhou, Guangdong Province (CN)

(73) Assignee: South China University of Technology, Guangzhou (CN)

( * ) Notice: Subject to any disclaimer, the term of this patent is extended or adjusted under 35 U.S.C. 154(b) by 133 days.

(21) Appl. No.: 15/111,365

(22) PCT Filed: Jan. 7, 2015

(86) PCT No.: PCT/CN2015/070255
§ 371 (c)(1),
(2) Date: Jul. 13, 2016

(87) PCT Pub. No.: WO2015/103977
PCT Pub. Date: Jul. 16, 2015

(65) Prior Publication Data
US 2017/0222807 A1    Aug. 3, 2017

(30) Foreign Application Priority Data
Jan. 13, 2014   (CN) .......................... 2014 1 0015211

(51) Int. Cl.
*H04L 29/06*     (2006.01)
*H04L 9/30*      (2006.01)
*H04L 9/08*      (2006.01)

(52) U.S. Cl.
CPC .......... *H04L 9/3093* (2013.01); *H04L 9/0852* (2013.01); *H04L 9/3066* (2013.01)

(58) Field of Classification Search
None
See application file for complete search history.

(56) References Cited

U.S. PATENT DOCUMENTS

| | | | |
|---|---|---|---|
| 2006/0140400 A1* | 6/2006 | Brown | H04L 9/3066 380/30 |
| 2006/0171531 A1* | 8/2006 | Teranisi | H04L 9/3093 380/28 |
| 2011/0016325 A1* | 1/2011 | Futa | H04L 9/3247 713/179 |

FOREIGN PATENT DOCUMENTS

| CN | 1870499 A | 11/2006 |
|---|---|---|
| CN | 103457726 A | 12/2013 |

(Continued)

OTHER PUBLICATIONS

English Abstract for CN 103780382 A dated May 7, 2014.
(Continued)

*Primary Examiner* — Eleni A Shiferaw
*Assistant Examiner* — Andrew J Steinle
(74) *Attorney, Agent, or Firm* — Fishman Stewart PLLC

(57) ABSTRACT

A hypersphere-based multivariable public key encryption/decryption system may include an encryption module and a decryption module. The encryption module may include a processor and a public key transformation component for transforming plaintext into ciphertext. The decryption module may include a processor, a first affine transformation inversion component, a trapdoor component and a second affine transformation inversion component. The trapdoor component may include a linear equation system construction component and a linear equation system solving component. All components may execute corresponding operations, so that a set of data may be obtained finally, and the set of data may be stored and output as decrypted plaintext. If the decryption module does not produce data, the proces- (Continued)

sor may output warning information about a decryption failure to a user.

9 Claims, 1 Drawing Sheet

(56) References Cited

FOREIGN PATENT DOCUMENTS

| | | |
|---|---|---|
| CN | 103490883 A | 1/2014 |
| CN | 103490897 A | 1/2014 |
| CN | 103501227 A | 1/2014 |
| CN | 103780382 A | 5/2014 |
| CN | 103780383 A | 5/2014 |

OTHER PUBLICATIONS

English Abstract for CN 103780383 A dated May 7, 2014.
English Abstract for CN 103490883 A dated Jan. 1, 2014.
English Abstract for CN 103490897 A dated Jan. 1, 2014.
English Abstract for CN 103457726 A dated Dec. 18, 2013.
English Abstract for CN 10870499 A dated Nov. 29, 2016.
English Abstract for CN 103501227 A dated Jan. 8, 2014.
English Translation of International Search Report for WO 2015/103977 dated Mar. 30, 2015.

* cited by examiner

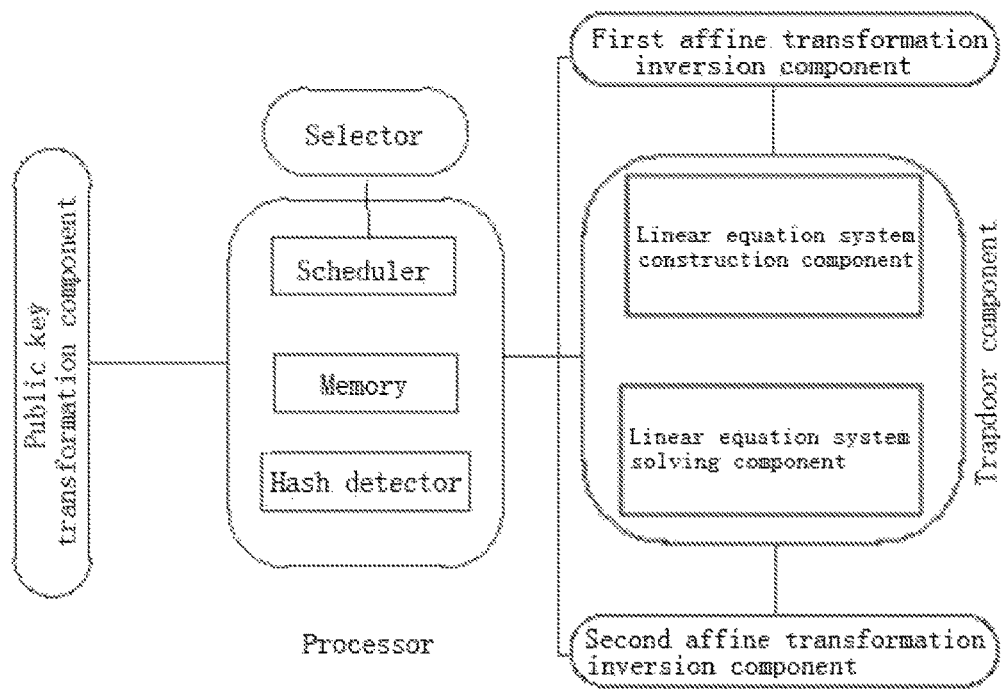

US 10,142,105 B2

HYPERSPHERE-BASED MULTIVARIABLE PUBLIC KEY ENCRYPTION/DECRYPTION SYSTEM AND METHOD

CROSS-REFERENCE TO RELATED APPLICATIONS

This application claims priority to Chinese Patent Application No. 201410015211.2 filed Jan. 13, 2014 and PCT/CN2015/070255 filed Jan. 7, 2015, which are hereby incorporated by reference in their entirety.

TECHNICAL FIELD

The present invention relates to the field of information security, and in particular, to a hypersphere-based multivariable public key encryption/decryption system and method.

BACKGROUND ART

The cryptographic techniques are the core and foundation for information security and are widely applied to the fields of network communications, electronic commerce, banks and national defence and military. The cryptographic techniques comprise symmetric cryptography and asymmetric cryptography which is also referred to as public key cryptography.

At present, the security of the public key cryptography is mainly dependent on hard problems of large integer factorization and discrete logarithm solving, and the like, such as RSA, ECC, etc. However, after methods capable of implementing large integer factorization and discrete logarithm solving on quantum computers are proposed, this type of traditional public key cryptography has faced a huge threat, and various industries have been affected. Therefore, people have been working to find a cryptographic system capable of protecting against attacks from the quantum computers so as to satisfy the requirement of information security, and this type of system is called post quantum cryptography, one of which is the multivariable public key cryptography.

MPKC plays an important role in the post quantum encryption schemes. The existing MPKC schemes are almost insecure, because a randomly designed quadratic equation has no threshold, and thus it cannot be used for encryption. However, for a mathematical structure generated by a corresponding centralizing mapping, the centralizing mapping thereof can generally be obtained by derivation (i.e. no hiding), such that many MPKC schemes are not only on the basis of MQ problems, there are also structural problems, such as MI, Square, triangular schemes, and the like. Therefore, it is very important for MPKC scheme designing to design a centralizing mapping which is hiding, but has a threshold. At present, schemes designed in this way comprise HFE, ABC, and the like. Although there exists hiding in the centralizing mapping of the former, due to the needs of decryption, the rank of a matrix corresponding to the entire mapping is made very small, rendering it not being able to protect against rank attacks. With respect to the latter, due to the randomness of the centralizing mapping, there is no relevant attacking methods cracking it at present. However, also due to the randomness of the centralizing mapping, it cannot be absolutely decrypted successively, even if it emphasizes that the probability of success decryption can be made very high by setting parameters, for a cryptographic system, this is still not suitable.

As for MPKC schemes, one common technique is the "large field technique", that is, a public key is map to a large field K, and then vector isomorphism is used (isomorphism is needed). This method is a double-edged sword, because the structure of K makes decryption easy, but such a structure is also easily used by the attackers.

SUMMARY OF THE INVENTION

The primary object of the present invention is to overcome the disadvantage and shortcomings of the prior art and provide a hypersphere-based multivariable public key encryption/decryption system.

The other object of the present invention is to provide a hypersphere-based multivariable public key encryption/decryption method.

The object of the present invention is implemented by means of the following technical solution:

A hypersphere-based multivariable public key encryption/decryption system, containing:

A. an encryption module for performing encryption processing on plaintext to be encrypted so as to form ciphertext and complete encryption, which comprises a processor and a public key transformation component, wherein, after the plaintext to be encrypted is transmitted to the processor, the processor stores the plaintext, and then transmits plaintext data to the public key transformation component; the encrypted ciphertext is obtained by respectively substituting the plaintext data into multivariable polynomials; the ciphertext is subsequently transmitted to the processor for storage; and then the processor transmits the ciphertext to decryption modules of other users; and B. a decryption module for performing decryption processing on ciphertext data transmitted from other users so as to form plaintext and complete decryption, which comprises the processor, a first affine transformation inversion component, a trapdoor component and a second affine transformation inversion component, with the trapdoor component containing a linear equation system construction component and a linear equation system solving component, wherein, after the ciphertext data is received, the ciphertext is firstly transmitted by the processor to the first affine transformation inversion component for an affine transformation inversion computation, and then transmitted to the linear equation system construction component and the linear equation system solving component of the trapdoor component respectively for a linear equation system construction computation and a linear equation system solving computation; a group of solutions obtained through the polynomial inversion computation are transmitted to the second affine transformation inversion component for an affine transformation inversion computation and are finally transmitted to the processor; for one or more sets of data transmitted, the processor respectively calculates a hash value for each set of data, if an obtained hash value of a certain set of data is equal to plaintext hash redundant data prestored in the processor, the set of data is stored and output as decrypted plaintext; and if none of the hash values is equal to the plaintext hash redundant data, the processor outputs warning information about a decryption failure to a user.

Said hypersphere-based multivariable public key encryption/decryption system further contains a selector which is connected to the processor, wherein, when the selector is in an open state, the encryption module of the system works; and when the selector is in a closed state, the decryption module of the system works.

Said processor contains a scheduler connected to the selector, wherein the open state and the closed state of the selector are identified and processed by the scheduler in the processor, and data stored in the processor is controlled and scheduled by the scheduler to the corresponding components for corresponding operations.

Said processor further contains a Hash detector and a memory, wherein the calculations of the hash values of the data in the processor are accomplished by the Hash detector, and the storage of the data in the processor is accomplished by the memory.

The other object of the present invention is implemented by means of the following technical solution:

A hypersphere-based multivariable public key encryption/decryption method, containing steps in the following order:

(1) an encryption process:

a. after plaintext to be encrypted is transmitted to a processor, calculating a hash value thereof by the processor to obtain plaintext hash redundant data and stores the plaintext and the plaintext hash redundant data;

b. transmitting the plaintext data to a public key transformation component, and obtaining encrypted ciphertext by substituting the plaintext data into multivariable polynomials; and c. subsequently transmitting the ciphertext to the processor for storage, and transmitting, by the processor, the ciphertext together with the plaintext hash redundant data to decryption modules of other users; and (2) a decryption process:

a. after ciphertext and plaintext hash redundant data transmitted from other users is received, firstly storing the plaintext hash redundant data by the processor, and then transmitting the ciphertext to a first affine transformation inversion component for an affine transformation inversion computation;

b. then transmitting inverted data to a linear equation system construction component and a linear equation system solving component of a trapdoor component respectively for a linear equation system construction operation and a linear equation system solving operation, with one or more groups of solutions obtained through the linear equation system solving operation;

c. transmitting the solutions obtained above to a second affine transformation inversion component for an affine transformation inversion computation; and d. finally performing transmission to the processor, and for one or more sets of data transmitted, respectively calculating a hash value for each set of data by the processor, if a hash value of a certain set of data is equal to plaintext hash redundant data prestored in the processor, storing the set of data and outputting the same decrypted plaintext; and if none of the hash values is equal to the plaintext hash redundant data, outputting, by the processor, warning information about a decryption failure to a user.

Said step (1) of encryption process contains:

a. after the plaintext to be encrypted $(x_1', \ldots, x_n') \in F^n$ is transmitted to the processor, calculating, by the processor, the hash value thereof $(h_1', \ldots, h_j') = \text{Hash}(x_1', \ldots, x_n')$ to obtain the plaintext hash redundant data $(h_1', \ldots, h_j')$, with Hash($\cdot$) being a cryptographically secure one-way function, and storing the plaintext and the plaintext hash redundant data;

b. transmitting the plaintext $(x_1', \ldots, x_n')$ data to the public key transformation component, and substituting, by the public key transformation component, the plaintext data into a public key mapping $P(x_1, \ldots, x_n)$ i.e. respectively calculating the values of the multivariable polynomials $p_1(x_1', \ldots, x_n'), \ldots, p_m(x_1', \ldots, x_n')$ of which the values are respectively denoted as $y_1', \ldots, y_m'$, with $(y_1', \ldots, y_m')$ being the encrypted ciphertext; and c. subsequently transmitting the ciphertext $(y_1', \ldots, y_m')$ to the processor for storage, and transmitting, by the processor, the ciphertext $(y_1', \ldots, y_m')$ together with the plaintext hash redundant data $(h_1', \ldots, h_j')$ to decryption modules of other users; and the step (2) of decryption process contains:

a. after the ciphertext $(y_1', \ldots, y_m')$ and the plaintext hash redundant data $(h_1', \ldots, h_j')$ transmitted from other users is received, firstly storing the plaintext hash redundant data $(h_1', \ldots, h_j')$ by the processor, and then transmitting the ciphertext $(y_1', \ldots, y_m')$ to the first affine transformation inversion component for the affine transformation inversion computation $(\tilde{y}_1, \ldots, \tilde{y}_m) = L_1^{-1}(y_1', \ldots, y_m')$;

b. then transmitting the $(\tilde{y}_1, \ldots, \tilde{y}_m)$ to the trapdoor component respectively for the linear equation system construction operation and the linear equation system solving operation, i.e. the linear equation system construction component constructs an equation system simultaneously using m sets of data $(c_{i,1}, c_{i,2}, \ldots, c_{i,n})$ preallocated to the trapdoor component by the scheduler as well as $(\tilde{y}_1, \ldots, \tilde{y}_m)$, wherein the details are as follows:

$$\begin{cases} (\tilde{x}_1 - c_{1,1})^2 + \ldots + (\tilde{x}_n - c_{1,n})^2 = \tilde{y}_1 \\ \ldots \\ (\tilde{x}_1 - c_{m,1})^2 + \ldots + (\tilde{x}_n - c_{m,n})^2 = \tilde{y}_m \end{cases}$$

is donated as equation I, and the equation I is extended into equation II:

$$\begin{cases} (\tilde{x}_1^2 - 2c_{1,1}\tilde{x}_1 + c_{1,1}^2) + \ldots + (\tilde{x}_n^2 - 2c_{1,n}\tilde{x}_n + c_{1,n}^2) = \tilde{y}_1 \\ \ldots \\ (\tilde{x}_1^2 - 2c_{m,1}\tilde{x}_1 + c_{m,1}^2) + \ldots + (\tilde{x}_n^2 - 2c_{m,n}\tilde{x}_n + c_{m,n}^2) = \tilde{y}_m \end{cases}$$

the equation I subtracts the equation II to obtain equation III:

$$\begin{cases} (2c_{2,1} - 2c_{1,1})\tilde{x}_1 + \ldots + (2c_{2,n} - 2c_{1,n})\tilde{x}_n + \\ (c_{1,1}^2 - c_{2,1}^2) + \ldots + (c_{1,n}^2 - c_{2,n}^2) = \tilde{y}_1 - \tilde{y}_2 \\ \ldots \\ (2c_{m,1} - 2c_{m-1,1})\tilde{x}_1 + \ldots + (2c_{m,n} - 2c_{m-1,n})\tilde{x}_n + \\ (c_{m-1,1}^2 - c_{m,1}^2) + \ldots + (c_{m-1,n}^2 - c_{m,n}^2) = \tilde{y}_{m-1} - \tilde{y}_m \end{cases}$$

the equation III is converted into a matrix form to obtain equation IV:

$$\begin{bmatrix} (2c_{2,1} - 2c_{1,1}) \ldots (2c_{2,n} - 2c_{1,n}) \\ \ldots \\ (2c_{m,1} - 2c_{m1,1}) \ldots (2c_{m,n} - 2c_{m1,n}) \end{bmatrix} \begin{bmatrix} \tilde{x}_1 \\ \ldots \\ \tilde{x}_n \end{bmatrix} =$$

$$\begin{bmatrix} (\tilde{y}_1 - \tilde{y}_2) + \sum_{j=1}^{n} (c_{2,j}^2 - c_{1,j}^2) \\ \ldots \\ (\tilde{y}_{m-1} - \tilde{y}_m) + \sum_{j=1}^{n} (c_{m,j}^2 - c_{m1,j}^2) \end{bmatrix}$$

and the equation IV is a linear equation system which is related to $(\tilde{x}_1, \ldots, \tilde{x}_n)$ and constructed by the linear equation system construction component; and then the linear equation system solving component solves the equation IV using a Gaussian elimination method, wherein there are one or more groups of solutions, and the number of groups of solutions is set to d sets, with a solution set being denoted as $(\tilde{x}_{i1}, \ldots, \tilde{x}_{in}), (1 \leq i \leq d)$;

c. then transmitting the obtained data to the second affine transformation inversion component for the affine transformation inversion computation $(x_{i1}', \ldots, x_{in}') = S_{-1}(\tilde{x}_{i1}, \ldots, \tilde{x}_{in}), (1 \leq i \leq d)$; and d. finally transmitting $(x_{i1}', \ldots, x_{in}')$ to the processor, and calculating the hash values of $(x_{i1}', \ldots, x_{in}')$ by the processor, if the hash value of a certain ith set of data $(x_{i1}', \ldots, x_{in}')$ is equal to the plaintext hash redundant data $(h_1', \ldots, h_j')$, outputting the set of data $(x_{i1}', \ldots, x_{in}')$ as the decrypted plaintext; and if $(x_{i1}', \ldots, x_{in}') \neq (h_1', \ldots, h_j')$ for every i, outputting, by the processor, warning information about a decryption failure to the user.

Said hypersphere-based multivariable public key encryption/decryption method further contains the following step prior to the step (1) of encryption process: when the selector is in the open state, the encryption module of the system works, wherein the selector is connected to the processor; and further contains the following step prior to the step (2) of decryption process: when the selector is in the closed state, the decryption module of the system works, wherein the selector is connected to the processor.

Said processor contains a scheduler connected to the selector, wherein the open state and the closed state of the selector are identified and processed by the scheduler in the processor, and data stored in the processor is controlled and scheduled by the scheduler to the corresponding components for corresponding operations.

Said processor further contains a Hash detector and a memory, wherein the calculations of the hash values of the data in the processor are accomplished by the Hash detector, and the storage of the data in the processor is accomplished by the memory.

In comparison to the prior art, the present invention has the following advantages and beneficial effects:

1. The "large field technique" is not used, thereby preventing the use of isomorphic components to perform vector isomorphism while being able to guarantee the convenience of the decryption process. The "large field technique" means that a public key is map to a large field K, and then vector isomorphism is used (isomorphism is needed). This method is a double-edged sword, because the structure of K makes decryption easy, but such a structure is also easily used by the attackers. Our scheme completely gets rid of this technique, while the decryption process of our scheme has never become complex due to the lack of the isomorphism technique.

2. The designed centralizing mapping is completely hidden by N sets of "centres of sphere" as private keys, such that even if the attackers know the structure of our design, they cannot obtain any advantageous help. With regard to the centralizing mapping design, we set m random n-dimensional "centres of sphere" as hiding parameters (private keys), such that the geometric meaning of the encryption thereof is m "distance squares", while as regards decryption, the geometric meaning thereof is: knowing the centre of sphere and the distance, how to find points of a hypersphere satisfying the conditions.

3. The running speed is very fast, especially in the decryption process, only one linear equation system needs to be solved. At present, there are many encryption/decryption schemes, such as the HFE and ABC schemes of the multivariable schemes, and for almost all the traditional ECC and RSA encryption/decryption algorithms, the decryption process needs to perform modulus computations or complex mathematical computations such as scalar multiplication, and thus the decryption speed may be relative slow. However, for our scheme, only the linear equation system solving needs to be performed in the decryption process, and the Gaussian elimination computation needing to be used in the solving thereof obviously has a lower complexity of computation than most of the current schemes.

4. Under appropriate parameter selection, our scheme can resist the currently known algebraic attacks on the multivariable public key cryptography, and thus has a very high security. At present, the centralizing mapping designs of most of the MPKC schemes do not add hiding parameters as private keys. However, for a mathematical structure generated by a corresponding centralizing mapping, the centralizing mapping thereof can generally be obtained by derivation, such that many MPKC schemes are not only on the basis of MQ problems, there are also structural problems, such as MI, Square, triangular schemes, and the like, rendering the MPKC schemes cannot eventually assist corresponding algebraic structural attacks. Although there exists hiding in the centralizing mapping of the HFE scheme, due to the needs of decryption, the rank of a matrix corresponding to the entire mapping is made very small, rendering it not being able to protect against rank attacks. However, in our scheme, there are still hiding parameters as private keys in the centralizing mapping, and the centralizing mapping is full rank, so our scheme can resist rank attacks.

DESCRIPTION OF THE DRAWING

FIG. 1 is a structural schematic diagram of a hypersphere-based multivariable public key encryption/decryption system of the present invention.

DETAILED DESCRIPTION OF THE INVENTION

A structural schematic diagram of a hypersphere-based multivariable public key encryption/decryption system is shown in FIG. 1, containing:

A. a selector which is connected to a scheduler in a processor, wherein, when the selector is in an open state, an encryption module of the system works; and when the selector is in a closed state, a decryption module of the system works;

B. an encryption module for performing encryption processing on plaintext to be encrypted so as to form ciphertext and complete encryption, which comprises a processor and a public key transformation component, the plaintext to be encrypted being transmitted to the processor, wherein the processor contains the scheduler, a Hash detector and a memory, the Hash detector calculating a hash value for the plaintext to obtain plaintext hash redundant data and storing the plaintext and the plaintext hash redundant data thereof in the memory, and then transmitting the plaintext data to the public key transformation component; the public key transformation component substituting the plaintext data into a public key mapping, i.e. respectively calculating the values of the multivariable polynomials to obtain the encrypted ciphertext; the ciphertext being subsequently transmitted to the processor for storage; and then the processor transmits the ciphertext together with the plaintext hash redundant data to decryption modules of other users; and C. a decryption module for performing decryption processing on ciphertext data transmitted from other users so as to form plaintext and complete decryption, which comprises the processor, a first affine transformation inversion component, a trapdoor component and a second affine transformation inversion component, with the trapdoor component containing a linear equation system construction component and a linear equation system solving component, wherein, after the ciphertext data is received, the ciphertext is firstly transmitted by the processor to the first affine transformation inversion component for an affine transformation inversion computation, and then transmitted to the linear equation system construction component and the linear equation system solving component of the trapdoor component respectively for a linear equation system construction computation and a linear equation system solving computation; a group of solutions obtained through the polynomial inversion computation are transmitted to the second affine transformation inversion component for an affine transformation inversion computation and are finally transmitted to the processor; for one or more sets of data transmitted, the processor respectively calculates a hash value for each set of data, if an obtained hash value of a certain set of data is equal to plaintext hash redundant data prestored in the processor, the set of data is stored and output as decrypted plaintext; and if none of the hash values is equal to the plaintext hash redundant data, the processor outputs warning information about a decryption failure to a user.

Initialization needs to be performed before the hypersphere-based multivariable public key encryption/decryption system is used for the first time, as shown below:

(1) Arithmetic computations of all the components of the system are on the basis of a finite field F having an order of q, where q is an odd prime.

(2) Let the number of equations of the multivariable public key cryptography system be m, and the number of variables be n.

(3) In the first affine transformation inversion component, let $T(\bar{y}_1, \ldots, \bar{y}_m) = (y_1, \ldots, y_m)$ be a randomly selected invertible affine transformation from $F^m$ to $F^m$; and similarly, in the second affine transformation inversion component, let $S(x_1, \ldots, x_n) = (\bar{x}_1, \ldots, \bar{x}_n)$ be a randomly selected invertible affine transformation from $F^n$ to $F^n$.

(4) In the trapdoor component, the system randomly selects m sets of centre of sphere data $(c_{i,1}, c_{i,2}, \ldots, c_{i,n})$ to satisfy $c_{i,j} \in F_q, 1 \leq i \leq m, 1 \leq j \leq n$.

(5) In the public key transformation component, the centralizing mapping is initialized $F = (f_1, \ldots, f_m)$, that is, $m \cdot f_i$ constitutes the centralizing mapping. Let $f_i = (x_1 - c_{i,1})^2 + (x_2 - c_{i,2})^2 + \ldots + (x_n - c_{i,n})^2, 1 \leq i \leq m$, where $(c_{i,1}, c_{i,2}, \ldots, c_{i,n})$ are m sets of centre of sphere data randomly selected by the system in the trapdoor component. Finally, let $P = T \circ F \circ S(x_1, \ldots, x_n)$ be the corresponding public key mapping.

(6) The data of the above relevant mapping are stored in the memory after system initialization, and in the system working process, are controlled and scheduled by the scheduler to the corresponding components for corresponding operations.

After the initialization finishes, the system can be formally used.

A hypersphere-based multivariable public key encryption/decryption method, contains steps in the following order:

(1) an encryption process:

a. when a selector is in an open state, an encryption module of a system works; the selector is connected to the scheduler of a processor, the processor containing the scheduler, a Hash detector and the memory: after the plaintext to be encrypted $(x_1', \ldots, x_n') \in F^n$ transmitted to the processor, calculating the hash value thereof $(h_1', \ldots, h_j') = \text{Hash}(x_1', \ldots, x_n')$ by the Hash detector to obtain plaintext hash redundant data $(h_1', \ldots, h_j')$, with $\text{Hash}(\cdot)$ being a cryptographically secure one-way function, and then storing the plaintext and the plaintext hash redundant data thereof in the memory;

b. transmitting the plaintext $(x_1', \ldots, x_n')$ to the public key transformation component, and substituting, by the public key transformation component, the data into a public key mapping $P(x_1, \ldots, x_n)$ i.e. respectively calculating the values of the multivariable polynomials $p_1(x_1', \ldots, x_n'), \ldots, p_m(x_1', \ldots, x_n')$, of which the values are respectively denoted as $y_1', \ldots, y_n'$, with the data $(y_1', \ldots, y_n')$ being the encrypted ciphertext;

c. subsequently transmitting the ciphertext $(y_1', \ldots, y_n')$ to the processor for storage, and then transmitting, by the processor, the ciphertext $(y_1', \ldots, y_n')$ together with the plaintext hash redundant data $(h_1', \ldots, h_j')$ to decryption modules of other users; and (2) a decryption process:

a. when the selector is in a closed state, the decryption module of the system works: after the ciphertext $(y_1', \ldots, y_m')$ and the plaintext hash redundant data $(h_1', \ldots, h_j')$ transmitted from other users is received, firstly storing the plaintext hash redundant data $(h_1', \ldots, h_j')$ by the processor, and then transmitting the ciphertext $(y_1', \ldots, y_m')$ to the first affine transformation inversion component for the affine transformation inversion computation $(\tilde{y}_1, \ldots, \tilde{y}_m) = L_1^{-1}(y_1', \ldots, y_m')$;

b. then transmitting the $(\tilde{y}_1, \ldots, \tilde{y}_m)$ to the trapdoor component respectively for the linear equation system construction operation and the linear equation system solving operation, i.e. constructing, by the linear equation system construction component, an equation system (I) simultaneously using m sets of data $(c_{i,1}, c_{i,2}, \ldots, c_{i,n})$ preallocated to the trapdoor component as well as $(\tilde{y}_1, \ldots, \tilde{y}_m)$, wherein the form is as follows:

$$\begin{cases} (\tilde{x}_1 - c_{1,1})^2 + \ldots + (\tilde{x}_n - c_{1,n})^2 = \tilde{y}_1 \\ \ldots \\ (\tilde{x}_1 - c_{m,1})^2 + \ldots + (\tilde{x}_n - c_{m,n})^2 = \tilde{y}_m \end{cases} \quad (I)$$

the equation (I) is extended into:

$$\begin{cases} (\tilde{x}_1^2 - 2c_{1,1}\tilde{x}_1 + c_{1,1}^2) + \ldots + (\tilde{x}_n^2 - 2c_{1,n}\tilde{x}_n + c_{1,n}^2) = \tilde{y}_1 \\ \ldots \\ (\tilde{x}_1^2 - 2c_{m-1,1}\tilde{x}_1 + c_{m,1}^2) + \ldots + (\tilde{x}_n^2 - 2c_{m,n}\tilde{x}_n + c_{m,n}^2) = \tilde{y}_m \end{cases} \quad (II)$$

for equation (II), the first equation subtracts the second equation, . . . , and the (m−1)th equation subtracts the mth equation to obtain:

$$\begin{cases} (2c_{2,1} - 2c_{1,1})\tilde{x_1} + \ldots + (2c_{2,n} - 2c_{1,n})\tilde{x_n} + \\ (c_{1,1}^2 - c_{2,1}^2) + \ldots + (c_{1,n}^2 - c_{2,n}^2) = \tilde{y_1} - \tilde{y_2} \\ \ldots \\ (2c_{m,1} - 2c_{m-1,1})\tilde{x_1} + \ldots + (2c_{m,n} - 2c_{m-1,n})\tilde{x_n} + \\ (c_{m-1,1}^2 - c_{m,1}^2) + \ldots - (c_{m-1,n}^2 - c_{m,n}^2) = \tilde{y_{m-1}} - \tilde{y_m} \end{cases} \quad (III)$$

equation (III) is written in a matrix form to obtain:

$$\begin{bmatrix} (2c_{2,1} - 2c_{1,1}) \ldots (2c_{2,n} - 2c_{1,n}) \\ \ldots \\ (2c_{m,1} - 2c_{m-1,1}) \ldots (2c_{m,n} - 2c_{m-1,n}) \end{bmatrix} \begin{bmatrix} \tilde{x_1} \\ \ldots \\ \tilde{x_n} \end{bmatrix} = \quad (IV)$$

$$\begin{bmatrix} (\tilde{y_1} - \tilde{y_2}) + \sum_{j=1}^{n}(c_{2,j}^2 - c_{1,j}^2) \\ \ldots \\ (\tilde{y_{m-1}} - \tilde{y_m}) + \sum_{j=1}^{n}(c_{m,j}^2 - c_{m-1,j}^2) \end{bmatrix}$$

and the equation (IV) is a linear equation system which is related to $(\tilde{x}_1, \ldots, \tilde{x}_n)$ and constructed by the linear equation system construction component; and then the linear equation system solving component solves the equation (IV) using a Gaussian elimination method, wherein there are one or more groups of solutions, and the number of groups of solutions is set to d, with a solution set being denoted as $(\tilde{x}_{i1}, \ldots, \tilde{x}_{in})$, $(1 \leq i \leq d)$; c. then transmitting the obtained data to the second affine transformation inversion component for the affine transformation inversion computation $(x_{i1}', \ldots, x_{in}') = S^{-1}(\tilde{x}_{i1}, \ldots, \tilde{x}_{in})$, $(1 \leq i \leq d)$;

d. finally transmitting $(x_{i1}', \ldots, x_{in}')$ to the processor, and calculating the hash values of $(x_{i1}', \ldots, x_{in}')$ by the processor, if the hash value of a certain ith set of data $(x_{i1}', \ldots, x_{in}')$ is equal to the plaintext hash redundant data $(h_1', \ldots, h_j')$, outputting the set of data $(x_{i1}', \ldots, x_{in}')$ as the decrypted plaintext; and if $(x_{i1}', \ldots, x_{in}') \neq (h_1', \ldots, h_j')$ for every i, outputting, by the processor, warning information about a decryption failure to the user.

The initialization process of the system is introduced in detail with a specific example below:

(1) Computations of all the components are on the basis of a finite field F having an order q=3, where the base field F contains 3 elements, and these elements are respectively {0, 1, 2}, and the addition and the multiplication defined on the field is to mod 3 after the addition and multiplication of integers;

(2) the number of equations in the system is m=3, and the number of variables is n=2;

(3) in the first affine transformation inversion component, initialization is performed:

$$T(\overline{y_1}, \overline{y_2}, \overline{y_3}) = \begin{bmatrix} 1 & 2 & 0 \\ 0 & 1 & 1 \\ 2 & 0 & 1 \end{bmatrix} \begin{bmatrix} \overline{y_1} \\ \overline{y_2} \\ \overline{y_3} \end{bmatrix} + \begin{bmatrix} 2 \\ 0 \\ 1 \end{bmatrix} = \begin{bmatrix} y_1 \\ y_2 \\ y_3 \end{bmatrix},$$

and in the second affine transformation inversion component, initialization is performed:

$$S(x_1, x_2) = \begin{bmatrix} 1 & 1 \\ 1 & 2 \end{bmatrix}\begin{bmatrix} x_1 \\ x_2 \end{bmatrix} + \begin{bmatrix} 1 \\ 2 \end{bmatrix} = \begin{bmatrix} \overline{x_1} \\ \overline{x_2} \end{bmatrix};$$

(4) in the trapdoor component, three sets of "centres of sphere" are randomly selected: (1, 2), (2, 1) and (0, 1); and (5) in the public key transformation component, firstly, the centralizing mapping F is respectively:

$f_1(\overline{x_1}, \overline{x_2}) = (\overline{x_1}-1)^2 + (\overline{x_2}-2)^2,$ $f_2(\overline{x_1}, \overline{x_2}) = (\overline{x_1}-2)^2 + (\overline{x_2}-1)^2,$ $f_3(\overline{x_1}, \overline{x_2}) = (\overline{x_1}-0)^2 + (\overline{x_2}-1)^2.$ the specific equations of the public key transformation P is easily obtained through the equation $P = T \circ F \circ S(x_1, \ldots, x_n)$, which respectively comprise the following three equations:

$p_1(x_1, x_2) = x_2$ $p_2(x_1, x_2) = x_1^2 + x_1 + 2x_2 + x_2^2 + 1$ $p_3(x_1, x_2) = x_1.$

After the system initialization, the encryption and decryption of the plaintext (1, 2) will be described in detail below. Furthermore, in order to simply illustrate the entire encryption and decryption processes, without loss of generality, the hash value of the plaintext (1, 2) can be set as (1, 1, 1).

The encryption process:

(1) the selector is in the open state;

(2) for the plaintext to be encrypted M=(1, 2), the processor calls the Hash detector to calculate its hash value (1,1,1)=Hash(M) so as to obtain the plaintext hash redundant data (1, 1, 1), and stores the plaintext data (1, 2) and its plaintext hash redundant data (1, 1, 1) in the memory, and then the memory transmits the plaintext (1, 2) to the public key transformation component;

(3) after receiving the data, the public key transformation component interacts with the processor, calls the function P and respectively calculates $p_1(1,2), p_2(1,2), p_3(1,2)$ to obtain a result (2, 2, 1) and returns same to the memory; and (4) the processor uses the data (2, 2, 1) as ciphertext of the plaintext (1, 2) and transmits the ciphertext (2, 2, 1) together with its plaintext hash redundant data (1, 1, 1) to a user (or a device).

The decryption process:

(1) the selector is in the closed state;

(2) for the data to be decrypted (2, 2, 1) and its plaintext hash redundant data (1, 1, 1), an input transmits same to the memory and stores therein, and the processor transmits the ciphertext data (2, 2, 1) to the first affine transformation inversion component; (3) after receiving the data (2, 2, 1), the first affine transformation inversion component firstly interacts with the processor, calls a function and calculates $T^{-1}(2,2,1)=(1,1,1)$, and then transmits the result (1, 1, 1) to the trapdoor component; and (4) after receiving the data (1, 1, 1), the trapdoor component firstly interacts with the processor, then calls a linear equation system construction sub-component, wherein the sub-component constructs an equation system, i.e.

$$\begin{cases} f_1(\tilde{x_1}, \tilde{x_2}) = (\tilde{x_1} - 1)^2 + (\tilde{x_2} - 2)^2 = 1 \\ f_2(\tilde{x_1}, \tilde{x_2}) = (\tilde{x_1} - 2)^2 + (\tilde{x_2} - 1)^2 = 1 \\ f_3(\tilde{x_1}, \tilde{x_2}) = (\tilde{x_1} - 0)^2 + (\tilde{x_2} - 1)^2 = 1 \end{cases},$$

simultaneously using the three sets of centre of sphere data (1, 2), (2, 1) and (0, 1) preallocated by the scheduler to the trapdoor component as well as (1, 1, 1), and after the above three equations are expanded, the following equations can be obtained:

$$\begin{cases} \widetilde{x}_1^2 - 2\widetilde{x}_1 + 1 + \widetilde{x}_2^2 - 4\widetilde{x}_2 + 4 = 1 \\ \widetilde{x}_1^2 - 4\widetilde{x}_1 + 4 + \widetilde{x}_2^2 - 2\widetilde{x}_2 + 1 = 1 \\ \widetilde{x}_1^2 - \widetilde{x}_2^2 - 2\widetilde{x}_2 + 1 = 1 \end{cases},$$

wherein the above-mentioned first equation subtracts the second equation and the second equation subtracts the third equation to obtain:

$$\begin{cases} 2\widetilde{x}_1 - 3 - 2\widetilde{x}_2 + 3 = 0 \\ -4\widetilde{x}_1 + 4 = 0 \end{cases}$$

is the linear equation system constructed by the sub-component, and, afterwards, the trapdoor component calls a linear equation system solving sub-component to solve the solutions as to unknown variables of the equation system, i.e.

$$\begin{cases} \widetilde{x}_1 = 1 \\ \widetilde{x}_2 = 1 \end{cases};$$

and finally, the trapdoor component transmits the solution set (1, 1) to the second affine transformation inversion component;

(5) after receiving the data set (1, 1), the second affine transformation inversion component interacts with the processor, runs a program and calculates $S^{-1}(1, 1)$ to obtain the result (1, 2), and finally returns the data set to the memory;

(6) the processor calls the Hash detector, calculates the hash value for the data (1, 2), and discovers that the hash value of the data (1, 2) is (1, 1, 1), i.e. Hash(1,2)=(1,1,1) which is equal to the plaintext hash redundant data (1, 1, 1) in the memory; and (7) the processor transmits the data (1, 2) as the decrypted plaintext to the user (or the device).

The above-mentioned embodiment is a simple implementation of the present invention, but the implementations of the present invention are not limited to the above-mentioned embodiment. The system parameters recommended in the present invention are: q=31, n=34 and m=35; and the security level thereof can be higher than $2^{80}$. Any other change, modification, replacement, combination, simplification made without departing from the spirit or principles of the present invention should all be equivalent substitutions and be included within the scope of the present invention.

The invention claimed is:

1. A hypersphere-based multivariable public key encryption/decryption system, comprising:
an encryption module, which comprises a processor and a public key transformation component, wherein, after a plaintext to be encrypted is transmitted to the processor, the processor stores the plaintext, and then transmits the plaintext to the public key transformation component; an encrypted ciphertext is obtained by respectively substituting the plaintext into multivariable polynomials; the encrypted ciphertext is subsequently transmitted to the processor for storage; and then the processor transmits the encrypted ciphertext to a plurality of decryption modules of other users; and
a decryption module, which comprises the processor, a first affine transformation inversion component, a trapdoor component and a second affine transformation inversion component, with the trapdoor component containing a linear equation system construction component and a linear equation system solving component, wherein, after ciphertext data is received, the ciphertext data is firstly transmitted by the processor to the first affine transformation inversion component for an affine transformation inversion computation, and then transmitted to the linear equation system construction component and the linear equation system solving component of the trapdoor component respectively for a linear equation system construction computation and a linear equation system solving computation; a group of solutions obtained through the polynomial inversion computation are transmitted to the second affine transformation inversion component for an affine transformation inversion computation and are finally transmitted to the processor; for one or more sets of data transmitted, the processor respectively calculates a hash value for each set of data, if an obtained hash value of a certain set of data is equal to plaintext hash redundant data prestored in the processor, the set of data is stored and output as a decrypted plaintext; and if hash value is equal to the plaintext hash redundant data, the processor outputs warning information about a decryption failure to a user.

2. The hypersphere-based multivariable public key encryption/decryption system according to claim 1, further comprising a selector which is connected to the processor, wherein, when the selector is in an open state, the encryption module of the system works; and when the selector is in a closed state, the decryption module of the system works.

3. The hypersphere-based multivariable public key encryption/decryption system according to claim 2, wherein the processor comprises a scheduler connected to the selector, wherein the open state and the closed state of the selector are identified and processed by the scheduler in the processor, and data stored in the processor is controlled and scheduled by the scheduler to corresponding components for corresponding operations.

4. The hypersphere-based multivariable public key encryption/decryption system according to claim 1, wherein processor further comprises a hash detector and a memory, wherein a calculation of the hash value of the data in the processor are accomplished by the hash detector, and a storage of the data in the processor is accomplished by the memory.

5. A hypersphere-based multivariable public key encryption/decryption method, comprising steps in the following order:
(1) an encryption process:
a. after a plaintext to be encrypted is transmitted to a processor, calculating a hash value thereof by the processor to obtain plaintext hash redundant data and storing the plaintext and the plaintext hash redundant data;
b. transmitting the plaintext to a public key transformation component, and obtaining an encrypted ciphertext by substituting the plaintext into multivariable polynomials; and
c. subsequently transmitting a ciphertext to the processor for storage, and transmitting, by the processor, the ciphertext together with the plaintext hash redundant data to a plurality of decryption modules of other users; and (2) a decryption process:

a. after the ciphertext and the plaintext hash redundant data transmitted from other users is received, firstly storing the plaintext hash redundant data by the processor, and then transmitting the ciphertext to a first affine transformation inversion component for an affine transformation inversion computation;

b. then transmitting inverted data to a linear equation system construction component and a linear equation system solving component of a trapdoor component respectively for a linear equation system construction operation and a linear equation system solving operation, with one or more groups of solutions obtained through the linear equation system solving operation;

c. transmitting the solutions obtained above to a second affine transformation inversion component for an affine transformation inversion computation; and d. finally performing a transmission to the processor, and for one or more sets of data transmitted, respectively calculating a hash value for each set of data by the processor, if the hash value of a certain set of data is equal to the plaintext hash redundant data prestored in the processor, storing the set of data and outputting same as a decrypted plaintext; and if none of the hash value is equal to the plaintext hash redundant data, outputting, by the processor, warning information about a decryption failure to a user.

6. The hypersphere-based multivariable public key encryption/decryption method according to claim 5, wherein said step (1) of encryption process comprises:

a. after the plaintext to be encrypted $(x_1', \ldots, x_n') \in F^n$ is transmitted to the processor, calculating the hash value thereof $(h_1', \ldots, h_j')=\text{Hash}(x_1', \ldots, x_n')$ by the processor to obtain the plaintext hash redundant data $(h_1', \ldots, h_j')$, with $\text{Hash}(\cdot)$ with being a cryptographically secure one-way function, and storing the plaintext and the plaintext hash redundant data;

b. transmitting the plaintext $(x_1', \ldots, x_n')$ data to the public key transformation component, and substituting, by the public key transformation component, the plaintext data into a public key mapping $P(x_1, \ldots, x_n)$, namely respectively calculating values of the multivariable polynomials $p_1(x_1', \ldots, x_n'), \ldots, p_m(x_1', \ldots, x_n')$ of which the values are respectively denoted as $y_1', \ldots, y_m'$, with $(y_1', \ldots, y_m')$ being the encrypted ciphertext; and c. subsequently transmitting the ciphertext $(y_1', \ldots, y_m')$ to the processor for storage, and transmitting, by the processor, the ciphertext $(y_1', \ldots, y_m')$ together with the plaintext hash redundant data $(h_1', \ldots, h_j')$ to the plurality of decryption modules of other users; and the step (2) of decryption process contains:

a. after the ciphertext $(y_1', \ldots, y_m')$ and the plaintext hash redundant data $(h_1', \ldots, h_j')$ transmitted from other users is received, firstly storing the plaintext hash redundant data $(h_1', \ldots, h_j')$ by the processor, and then transmitting the ciphertext $(y_1', \ldots, y_m')$ to the first affine transformation inversion component for the affine transformation inversion computation $(\tilde{y}_1, \ldots, \tilde{y}_m)=L_1^{-1}(y_1', \ldots, y_m')$; b. then transmitting the $(\tilde{y}_1, \ldots, \tilde{y}_m)$ to the trapdoor component respectively for the linear equation system construction operation and the linear equation system solving operation, namely constructing, by the linear equation system construction component, an equation system simultaneously using m sets of data $(c_{i,1}, c_{i,2}, \ldots, c_{i,n})$ preallocated to the trapdoor component by the scheduler as well as $(\tilde{y}_1, \ldots, \tilde{y}_m)$ wherein the details are as follows:

$$\begin{cases} (\tilde{x}_1 - c_{1,1})^2 + \ldots + (\tilde{x}_n - c_{1,n})^2 = \tilde{y}_1 \\ \ldots \\ (\tilde{x}_1 - c_{m,1})^2 + \ldots + (\tilde{x}_n - c_{m,n})^2 = \tilde{y}_m \end{cases}$$

is denoted as equation I, and the equation I is extended into equation II:

$$\begin{cases} (\tilde{x}_1^2 - 2c_{1,1}\tilde{x}_1 + c_{1,1}^2) + \ldots + (\tilde{x}_n^2 - 2c_{1,n}\tilde{x}_n + c_{1,n}^2) = \tilde{y}_1 \\ \ldots \\ (\tilde{x}_1^2 - 2c_{m,1}\tilde{x}_1 + c_{m,1}^2) + \ldots + (\tilde{x}_n^2 - 2c_{m,n}\tilde{x}_n + c_{m,n}^2) = \tilde{y}_m \end{cases}$$

the equation I subtracts the equation II to obtain equation III:

$$\begin{cases} (2c_{2,1} - 2c_{1,1})\tilde{x}_1 + \ldots + (2c_{2,n} - 2c_{1,n})\tilde{x}_n + \\ (c_{1,1}^2 - c_{2,1}^2) + \ldots + (c_{1,n}^2 - c_{2,n}^2) = \tilde{y}_1 - \tilde{y}_2 \\ \ldots \\ (2c_{m,1} - 2c_{m-1,1})\tilde{x}_1 + \ldots + (2c_{m,n} - 2c_{m-1,n})\tilde{x}_n + \\ (c_{m-1,1}^2 - c_{m,1}^2) + \ldots + (c_{m-1,n}^2 - c_{m,n}^2) = \tilde{y}_{m-1} - \tilde{y}_m \end{cases}$$

the equation III is converted into a matrix form to obtain equation IV:

$$\begin{bmatrix} (2c_{2,1} - 2c_{1,1}) \ldots (2c_{2,n} - 2c_{1,n}) \\ \ldots \\ (2c_{m,1} - 2c_{m1,1}) \ldots (2c_{m,n} - 2c_{m1,n}) \end{bmatrix} \begin{bmatrix} \tilde{x}_1 \\ \ldots \\ \tilde{x}_n \end{bmatrix} = \begin{bmatrix} (\tilde{y}_1 - \tilde{y}_2) + \sum_{j=1}^{n}(c_{2,j}^2 - c_{1,j}^2) \\ \ldots \\ (\tilde{y}_{m-1} - \tilde{y}_m) + \sum_{j=1}^{n}(c_{m,j}^2 - c_{m1,j}^2) \end{bmatrix}$$

and the equation IV is a linear equation system which is related to $(\tilde{x}_1, \ldots, \tilde{x}_n)$ and constructed by the linear equation system construction component; and then the linear equation system solving component solves the equation IV using a Gaussian elimination method, wherein there are one or more groups of solutions and the number of groups of solutions is set to d, with a solution set being denoted as $(\tilde{x}_{i1}, \ldots, \tilde{x}_{in})$, $(1 \leq i \leq d)$;

c. then transmitting the obtained data to the second affine transformation inversion component for the affine transformation inversion computation $(x_{i1}', \ldots, x_{in}')=S^{-1}(\tilde{x}_{i1}, \ldots, \tilde{x}_{in})$, $(1 \leq i \leq d)$; and d. finally transmitting $(x_{i1}', \ldots, x_{in}')$ to the processor, and calculating the hash values of $(x_{i1}', \ldots, x_{in}')$ by the processor, if the hash value of a certain ith set of data $(x_{i1}', \ldots, x_{in}')$ is equal to the plaintext hash redundant data $(h_1', \ldots, h_j')$, outputting the set of data $(x_{i1}', \ldots, x_{in}')$ as the decrypted plaintext; and if $(x_{i1}', \ldots, x_{in}') \neq (h_1', \ldots, h_j')$ for every i, outputting, by the processor, warning information about a decryption failure to the user.

7. The hypersphere-based multivariable public key encryption/decryption method according to claim 5, wherein prior to the step (1) of the encryption process, the method further comprises the following step:

when a selector is in an open state, the encryption module of the system works, wherein the selector is connected to the processor; and prior to the step (2) of the decryption process, the method further comprises the following step:

when the selector is in a closed state, the decryption module of the system works, wherein the selector is connected to the processor.

8. The hypersphere-based multivariable public key encryption/decryption method according to claim 7, wherein the processor comprises a scheduler connected to the selector, the open state and the closed state of the selector are identified and processed by the scheduler in the processor, and the data stored in the processor is controlled and scheduled by the scheduler to corresponding components for corresponding operations.

9. The hypersphere-based multivariable public key encryption/decryption method according to claim 5, wherein the processor further comprises a hash detector and a memory, the calculations of the hash values of the data in the processor are accomplished by the hash detector, and a storage of the data in the processor is accomplished by the memory.

* * * * *